US007813021B2

(12) United States Patent
Akatsu

(10) Patent No.: US 7,813,021 B2
(45) Date of Patent: Oct. 12, 2010

(54) LIGHT SCANNING APPARATUS AND IMAGE FORMING APPARATUS INCLUDING LIGHT SCANNING APPARATUS

(75) Inventor: Kazuhiro Akatsu, Hitachinaka (JP)

(73) Assignee: Ricoh Company, Ltd., Tokyo (JP)

( * ) Notice: Subject to any disclaimer, the term of this patent is extended or adjusted under 35 U.S.C. 154(b) by 672 days.

(21) Appl. No.: 11/764,347

(22) Filed: Jun. 18, 2007

(65) Prior Publication Data

US 2007/0296800 A1 Dec. 27, 2007

(30) Foreign Application Priority Data

Jun. 21, 2006 (JP) ............................ 2006-171140

(51) Int. Cl.
*G02B 26/08* (2006.01)

(52) U.S. Cl. .................. 359/204.1; 250/234; 359/204.2

(58) Field of Classification Search ............... 359/204.1
See application file for complete search history.

(56) References Cited

U.S. PATENT DOCUMENTS

| | | | | |
|---|---|---|---|---|
| 4,644,160 | A | 2/1987 | Arimoto et al. | |
| 5,771,061 | A | 6/1998 | Komurasaki et al. | |
| 6,330,020 | B1 * | 12/2001 | Kamioka | 347/241 |
| 6,836,278 | B2 | 12/2004 | Saito et al. | |
| 2002/0001118 | A1 * | 1/2002 | Nakajima et al. | 359/204 |

FOREIGN PATENT DOCUMENTS

| | | | |
|---|---|---|---|
| JP | 60-126620 | | 7/1985 |
| JP | 03-64347 | | 3/1991 |
| JP | 04-085510 | | 3/1992 |
| JP | 6-331913 | | 12/1994 |
| JP | 8-68956 | | 3/1996 |
| JP | 2000-227563 | * | 8/2000 |
| JP | 2001-194603 | | 7/2001 |
| JP | 2001-264657 | | 9/2001 |
| JP | 2004-20791 | | 1/2004 |

* cited by examiner

*Primary Examiner*—James Phan
(74) *Attorney, Agent, or Firm*—Antonelli, Terry, Stout & Kraus, LLP.

(57) ABSTRACT

A light scanning apparatus comprising a photosynthesis device having a first light source unit and a second light source unit with a plurality of light sources spaced at equal intervals side by side in one direction, respectively for emitting rays in parallel from the plurality of light sources, a photosynthesis device for synthesizing transmitted rays from the first light source unit and reflected rays from the second light source unit on a single light path, and a light receiving device for focusing first synthesized rays synthesized by the photosynthesis device through an imaging lens, and an optical deflecting device for deflecting and scanning second synthesized rays synthesized by the photosynthesis device, and the second synthesized rays passed through the optical deflecting device is being externally emitted, wherein the photosynthesis device and the light receiving device are displaced relative to the optic axis of the first synthesized rays so as to position focused spots of the first synthesized rays at the center of a light receiving element provided in the light receiving device.

12 Claims, 5 Drawing Sheets

LIGHT SCANNING APPARATUS AND IMAGE FORMING APPARATUS INCLUDING LIGHT SCANNING APPARATUS

CLAIM OF PRIORITY

The present application claims priority from Japanese application serial No. 2006-171140, filed on Jun. 21, 2006, the content of which is hereby incorporated by reference into this application.

BACKGROUND OF THE INVENTION

1. Field of the Invention

The present invention relates to a light scanning apparatus mounted in a digital copier, a laser printer, or another image forming apparatus as well as an image forming apparatus including the light scanning apparatus, and more particularly to a light scanning apparatus having a photosynthesis device for synthesizes rays from a plurality of light sources and an image forming apparatus equipped therewith.

2. Prior Art

A light scanning apparatus having a photosynthesis device for synthesizing rays from a plurality of light sources is already disclosed in, for example, Patent Document 1.

Patent Document 1: Japanese patent No. 3064347

SUMMARY OF THE INVENTION

The light scanning apparatus disclosed in the above Patent Document 1 uses a galvano mirror as a device for adjusting the positions of rays, so all rays from the plurality of light sources can be corrected simultaneously by use of the galvano mirror.

However, the rays from the plurality of light sources are superimposed, so individual rays cannot be adjusted separately. As a result, the angle of a sequence of focused spots formed by synthesizing rays emitted from the plurality light sources on a photosensitive body, which is a medium to be scanned, cannot be held at a fixed value, which makes it hard to switch a print dot density by changing scanning intervals equally.

An object of the present invention is to provide a light scanning apparatus that can hold at a fixed value the angle of a focused spot sequence formed by synthesizing rays from a plurality of light sources and enables a print dot switchover to be made easily, and to provide an image forming apparatus including the light scanning apparatus.

In a light scanning apparatus comprising a photosynthesis device having a first light source unit and a second light source unit with a plurality of light sources spaced at equal intervals side by side in one direction, respectively for emitting rays in parallel from the plurality of light sources, a photosynthesis device for synthesizing transmitted rays from the first light source unit and reflected rays from the second light source unit on a single light path, and a light receiving device for focusing first synthesized rays synthesized by the photosynthesis device through an imaging lens, and includes an optical deflecting device for deflecting and scanning second synthesized rays synthesized by the photosynthesis device, and the second synthesized rays passed through the optical deflecting device is being externally emitted, the light scanning apparatus implemented by the present invention to solve the above problem is structured in such a way that the photosynthesis device and the light receiving device are displaced relative to the optic axis of the first synthesized rays so as to position focused spots of the first synthesized rays at the center of a light receiving element provided in the light receiving device.

As described above, a light scanning apparatus can be obtained, which can hold at a fixed value the angle of a sequence of spots synthesized and focused on a medium to be scanned, by displacing the photosynthesis device and the light receiving device relative to the optic axis of the first synthesized rays, when a plurality of light sources of synthesized rays are arranged in one way, and enables a print dot switchover to be made easily; an image forming apparatus including the light scanning apparatus can also be obtained.

DETAILED DESCRIPTION OF THE INVENTION

An embodiment of an image forming apparatus including a light scanning apparatus according to the present invention will be described below with reference to FIGS. 1 to 4.

Figure 2:
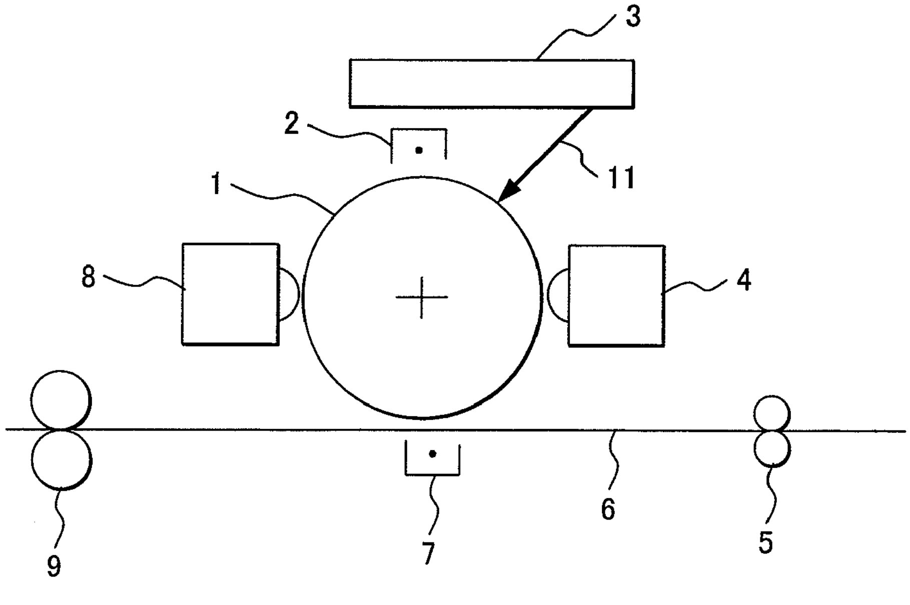
FIG. 2 is an approximate side view of an image forming apparatus including a light scanning apparatus according to an embodiment of the present invention.

As shown in FIG. 2, the image forming apparatus comprises a photosensitive body 1, which is a recording medium for forming a toner image and is also used as a medium to be scanned, the photosensitive body being in a drum shape and being rotated in one direction, a charging apparatus 2 for uniformly charging the photosensitive body 1 to a particular polarity, an optic scanning apparatus 3 that is disposed downstream of the charging apparatus 2 in the rotational direction of the photosensitive body 1 and forms an electrostatic latent image by irradiating rays to the charged photosensitive body 1, a developing apparatus 4 that opposes the photosensitive body 1 downstream of the optic scanning apparatus 3 in the rotational direction of the photosensitive body 1, a carrying apparatus 5, a print form 6 that is brought into contact with the photosensitive body 1 downstream of the developing apparatus 4 in the rotational direction of the photosensitive body 1 and carried by the carrying apparatus 5 in synchronization with the rotation of the photosensitive body 1, a transfer apparatus 7 disposed at a position where the print form 6 touches the photosensitive body 1, a cleaning apparatus 8 disposed upstream of the charging apparatus 2 in the rotational direction of the photosensitive body 1, and a fixing apparatus 9 disposed downstream of the transfer apparatus 7 in a direction in which the print form 6 moves.

In the image forming apparatus structured as described above, the photosensitive body 1, which rotates, is charged by the charging apparatus 2 so as to form a toner image. The photosensitive body 1 is then exposed to rays irradiated by the optic scanning apparatus 3 and forms an electrostatic latent image. When toner is then supplied from the developing apparatus 4 onto the photosensitive body 1, a toner image corresponding to the electrostatic latent image is formed on the photosensitive body 1. The print form 6 comes in contact with the photosensitive body 1 on which the toner image is formed. When the transfer apparatus 7 is operated to charge the back surface of the print form 6 with a polarity opposite to the polarity of the toner, the toner image on the photosensitive body 1 is transferred to the front surface of the print form 6. After the transfer process is completed, toner not transferred to the print form 6 is removed from the photosensitive body 1 by the cleaning apparatus 8, and the toner image transferred to the print form 6 is fixed by the fixing apparatus 9. The fixing apparatus 9 has a heat role, the heating of which is controlled so that it is held at a fixed temperature, and a pressurizing roller pressed against the heat roller. When the print form 6 passes between these rollers, the toner image held on the print form 6 is pressed, melted, and fixed. After the fixing process is completed, the print form 6 is transferred to the outside of the image forming apparatus.

Figure 3:
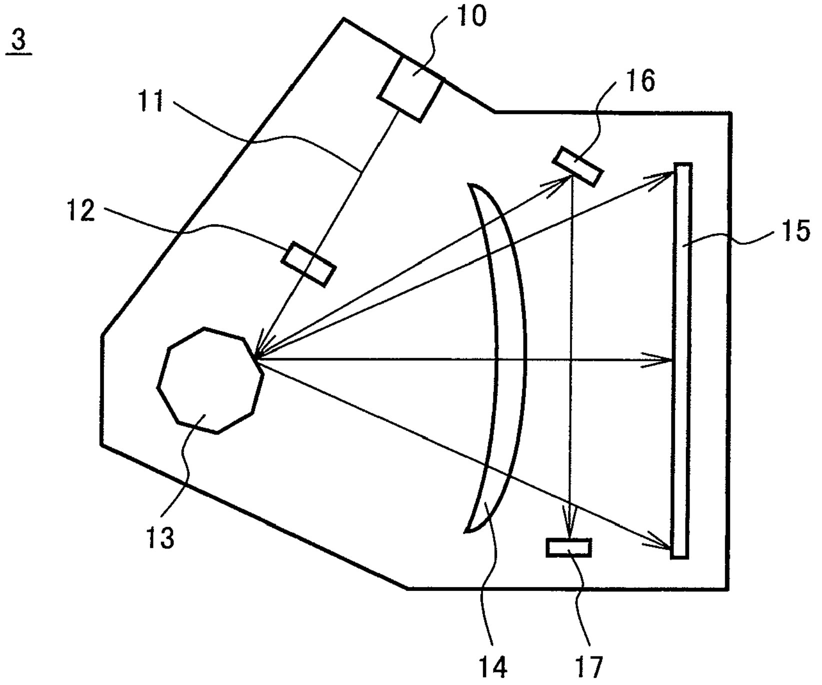
FIG. 3 is an approximate view of the light scanning apparatus in the present embodiment shown in FIG. 2.

As shown in FIG. 3, the optic scanning apparatus 3 comprises a photosynthesis device 10 for synthesizing rays emitted from a plurality of light sources described later, a cylindrical lens 12 that passes synthesized rays (second synthesized rays) 11 synthesized by the photosynthesis device 10 and has a prescribed curvature only in a vertical scanning direction, a rotating polyhedral mirror 13, which is an optical deflecting device for deflecting and scanning the second synthesized rays 11 that have passed through the cylindrical lens 12, an Fθ lens 14 that passes the synthesized rays 11 deflected by the rotating polyhedral mirror 13, a folding mirror 15 for reflecting the synthesized rays 11 that have passed through the Fθ lens 14 and forming an electrostatic latent image on the surface of the photosensitive body 1 shown in FIG. 2, and a sensor 17 for sensing part of the synthesized rays 11 that have passed through the Fθ lens 14 and then reflected by a mirror 16. An output signal from the sensor 17 is used to start modulation for writing the synthesized rays 11 irradiated from the photosynthesis device 10.

Figure 1:
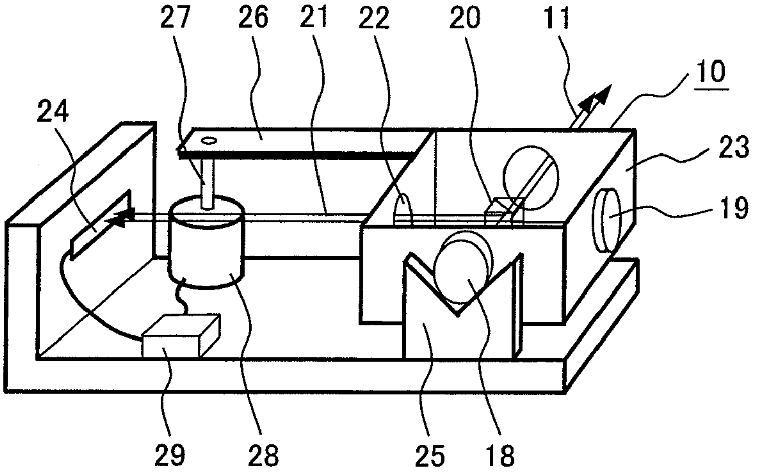
FIG. 1 is an approximate perspective view of a photosynthesis device according to an embodiment of the present invention.

As shown in FIG. 1, the photosynthesis device 10 of the optic scanning apparatus 3 structured as described above comprises a first light source unit 18, a second light source 19 for irradiating a ray, the optic axis of which differs 90 degrees from the optic axis of a ray from the first light source 18, a photosynthesis device 20 including a prism for synthesizing the two rays irradiated from the first light source 18 and second light source 19 by reflecting either of the rays and transmitting the other, an imaging lens 22 for transmitting the first synthesized ray 21 synthesized by the photosynthesis device 20 in the optic axis direction of the second light source 19, and a supporting box 23 for supporting these elements; a light receiving device 24 for receiving the first synthesized ray 21 that has passed through the imaging lens 22 is disposed at a position separated by the focal length of the imaging lens 22. The photosynthesis device 10 has a pair of oscillating mechanisms 25 on both sides in a direction in which the second synthesized ray 11 synthesized by the photosynthesis device 20 in the supporting box 23 propagates, as well as a driving arm 26 extending from the supporting box 23 in the same direction as the direction in which the first synthesized ray 21 propagates. A threaded rod 27 is threaded into an end of the driving arm 26. A motor 28 is connected to the threaded rod 27 for rotating the threaded rod 27 in the normal or reverse direction. The light receiving device 24 determines whether the first synthesized ray 21 is received, the result is output to a control device 29, and the motor 28 is driven according to the result to control the inclination of the supporting box 23. The driving arm 26, threaded rod 27, motor 28, and control device 29 constitute an inclining device for inclining the photosynthesis device 10 of the embodiment in the present invention.

In the photosynthesis device 10 structured as described above, the light receiving device 24 detects a spot of the first synthesized ray 21 that has passed through the imaging lens 22. The spots are arranged in a plane including the optic axis of the first synthesized rays 21 from the first light source 18 and second light source 19 so that the spots are in parallel to the optic axis of the second synthesized ray 11. When the supporting box 23 is inclined, the position of a spot near the light receiving device 24 changes in the vertical scanning direction.

A displacement of spots from the light receiving device 24 indicates that the angle of the spot sequence formed by the second synthesized rays 11 on the surface of the photosensitive body 1 has changed. In this case, the control device 29 drives the motor 28 to rotate it in the normal or reverse direction. The threaded rod 27 is then rotated to swing the driving arm 26 upward or downward with the oscillating mechanisms 25 being a fulcrum so as to adjust the inclination of the supporting box 23. The adjustment of the inclination of the supporting box 23 enables the light receiving device 24 to receive the spot of the first synthesized ray 21. When control is performed so that the amount of light received is maximized, the angle of the spot sequence formed by the second synthesized rays 11 on the photosensitive body 1 can be held at a fixed value. This spot position change is represented as a change turned around the second synthesized ray 11 with a radius of the sum of the focal length of the imaging lens 22 and the distance between the imaging lens 22 and the photosynthesis device 20, so a small change can be magnified at the time of detection.

The image forming apparatus may cause pitch flecks on a printout due to assembly error or parts error even if the angle of the spot sequence is set as designed. When this happens, it is necessary to adjust the angle of the spot sequence so that pitch flecks are not generated while the print state is being checked. Specifically, horizontal lines are actually printed; if there are variations in intervals of the printed horizontal lines, the printing is repeated with different angles of the spot sequence on the photosensitive body 1. The angle of the spot sequence is adjusted and the spot sequence is fixed at an angle at which the variations in the intervals are minimized.

When a worker performs this adjustment by manually inclining the supporting box 23 little by little, a slight inclination causes a large inclination of the optic axis of the first synthesized ray 21, making fine adjustment of the angle extremely difficult.

In this embodiment of the present invention, however, this fine adjustment can be performed by changing the position of the light receiving device 24.

Specifically, when the position of the light receiving device 24 is changed, the control device 29 drives the motor 28 to adjust the inclination of the supporting box 23 so that the spot of the first synthesized ray 21 from the imaging lens 22 is positioned at the center of the light receiving device 24. When the position of the light receiving device 24, which is a target position of a spot position near the light receiving device 24, is adjusted, the same effect as when the target angle is adjusted is provided. Since a magnified spot sequence angle can be adjusted instead of manually adjusting the angle of the supporting box 23, adjustment can be performed with ease. If the distance between the rotational center of the supporting box 23 and the light receiving device 24 is five times as long as the distance between the center of the supporting box 23 and the end of the supporting box 23, adjustment by changing the position of the light receiving device 24 is five times as fine as adjustment by manually inclining the supporting box 23.

Figure 4:
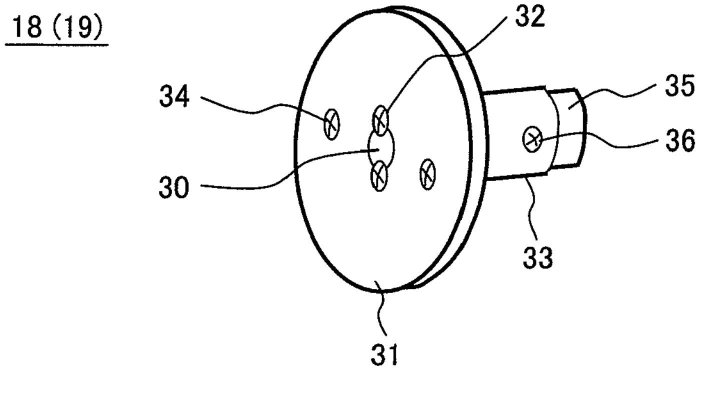
FIG. 4 is a perspective view of a light source unit in the present embodiment.

Next, the specific structure of the first light source 18 will be described with reference to FIG. 4. The description for the structure of the first light source 18 is also applied to that of the second light source 19, so its description will be omitted.

A light source 30 is secured to a light source holder 31 with screws 32. A collimator lens holder 33 is secured to the light source holder 31 with screws 34, and a collimator lens 35 is secured thereto with a screw 36. When the screws 34 and the screw 36 are loosened, the optic axis direction of the collimator lens 35 can be adjusted and the direction perpendicular to the optic axis between the light source 30 and the collimator lens 35 can be adjusted Upon the completion of the adjustment, the position of the collimator lens 35 is fixed by tightening the screws 34 and the screw 36.

The focal length of the imaging lens 22 of the photosynthesis device 10 may be determined according to an allowable value of the inclination angle of the supporting box 23 and the position detection precision of the light receiving device 24. Specifically when the position detection precision of the light receiving device 24 is ±1 mm and the allowable value of the inclination angle of the supporting box 23 is ±0.5 degree, the focal length may be set to 114.6 mm. The equation to calculate it is 1/tan (0.5 degree).

Next, how to switch the print dot density by using the photosynthesis device 10 will be described with reference to FIGS. 5 to 9.

Figure 5:
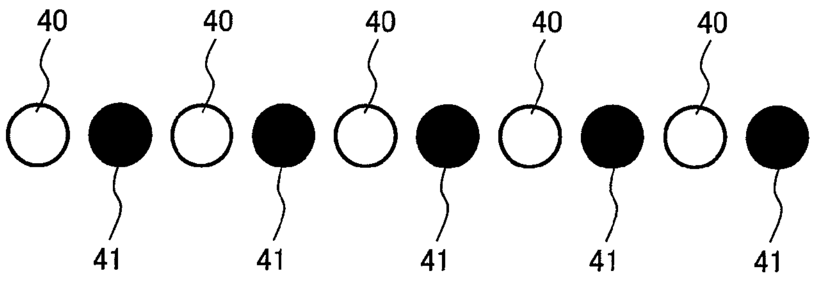
FIG. 5 is a simulated view of a spot sequence formed by synthesized rays on a photosensitive body in the present embodiment.

FIG. 5 shows an exemplary spot sequence on the photosensitive body 1. In this example, a spot sequence 40 from five first light sources 18 aligned at equal intervals and a spot sequence 41 from five second light sources 19 aligned at equal intervals are synthesized. These spot sequences 40 and 41 are also formed on the light receiving device 24 in a similar manner, and used to detect the inclination of the supporting box 23.

Figure 6:
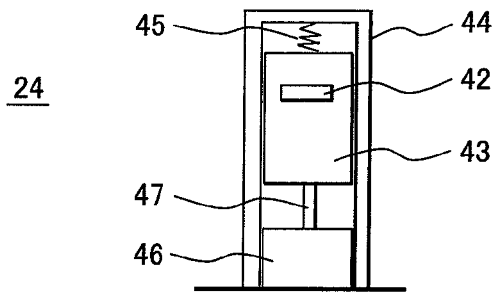
FIG. 6 is a front view of an exemplary light receiving device in the present embodiment.

As shown in FIG. 6, the light receiving device 24 has a light receiving element 42 in such a way that it can move vertically. Specifically, the light receiving element 42 is mounted in an element holder 43, and the element holder 43 is included in such a way that it can move only vertically within a frame 44. The element holder 43 is always pressed downward by a spring 45. The element holder 43 is also pressed by a pressing rod 47 from below against the force of the spring 45, the pressing rod 47 being extruded or retracted by the rotation of a motor 46. When the pressing rod 47 is a threaded rod and a threaded hole is formed at the bottom of the element holder 43 to accept the threaded rod, the spring 45 can be eliminated.

When the vertical position of the light receiving element 42 is changed in this way, the rotational radius for adjustment of the spot sequences 40 and 41 on the photosensitive body 1 can be enlarged, as compared with a case in which the inclination of the supporting box 23 is adjusted. As a result, fine angle adjustment can be performed with high precision, enabling the angle to be adjusted precisely.

When, in the above structure, the element holder 43 is raised or lowered by rotating the motor 46 and thereby the position of the light receiving element 42 is changed, the angle of the spot sequence on the photosensitive body 1 can be changed responsive to the changed position of the light receiving element 42. Accordingly, when the position of the light receiving element 42 is changed so as to lessen the angle, a switchover to a high print dot density can be made.

Figure 7:
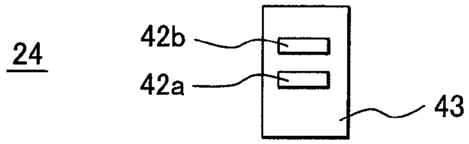
FIG. 7 is a front view of another exemplary light receiving device in the present embodiment.

A light receiving element 42*a* for a reference print dot density and a light receiving element 42*b* for another print dot density may be provided in the fixed element holder 43 as shown in FIG. 7 so that a switchover between the print dot densities can be made by inclining the supporting box 23 to select the light receiving element 42*a* or light receiving element 42*b*. When a switchover is made between the print dot densities, it is necessary to change the revolutions of the rotating polyhedral mirror 13 and the modulated frequencies of the light sources besides the changing of the scanning interval involved in the change of the angle of the above spot sequence.

Each of the light receiving elements 42, 42*a*, and 42*b* may be a single optic sensor, a two-part sensor, or a CCD camera if it can easily detect the positions, in the vertical scanning direction, of the light spot sequences.

An aspect of the photosynthesis device 10 will be described below, assuming that the reference print dot density is 1200 dpi. Five light sources are arranged at intervals of 150 μm, and the focal length of the collimator lens 35 is 15 mm. The magnification, in the scanning direction, of the scanning lens system including the Fθ lens 14 is 13 times, and that in the vertical scanning direction is 4 times.

Figure 8:
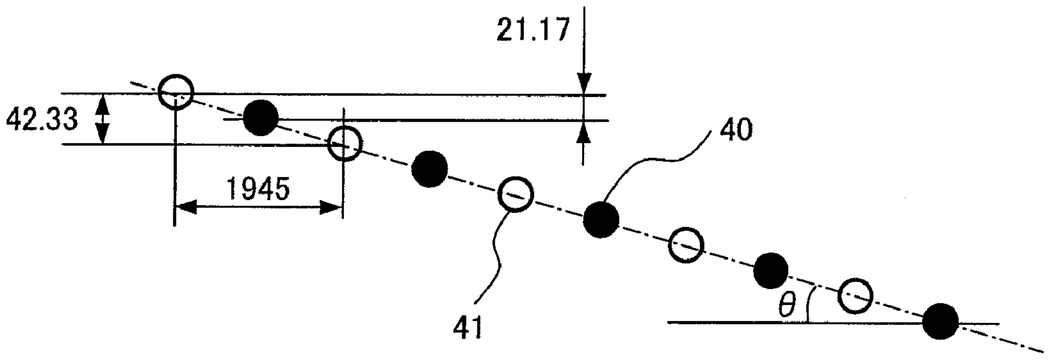
FIG. 8 is a simulated view showing an aspect indicating a spot sequence formed by synthesized rays on the photosensitive body in the present embodiment.
Figure 9:
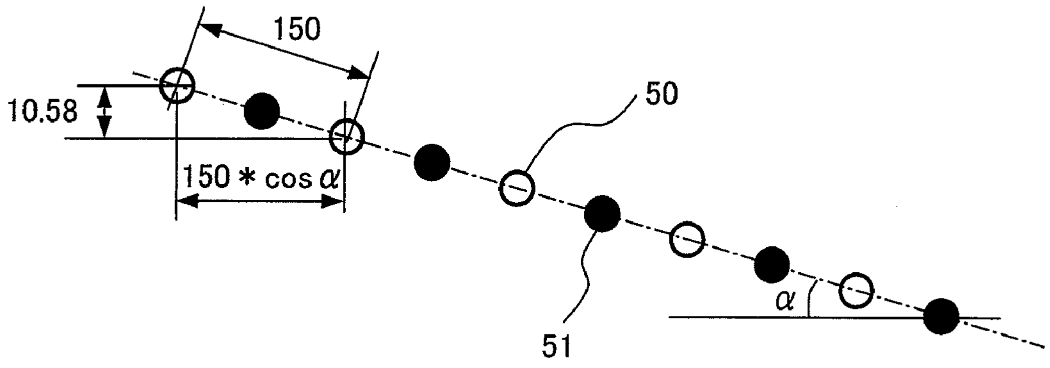
FIG. 9 is an estimated view indicating a sequence of light source positions in the present embodiment.

The spot sequences 40 and 41 are synthesized into a single sequence on the photosensitive body 1, as shown in FIG. 8. Since the reference print dot density is 1200 dpi, the intervals in the vertical scanning direction are uniformly fixed to 21.17 μm. The light sources are arranged so that element sequences 50 and 51 are aligned as shown in FIG. 9. Since the magnitude in the vertical scanning direction is 4 times, one interval, in the vertical scanning direction, in each element sequence before it is synthesized is 10.58 μm (=42.33/4). Since one interval in the element sequence before it is synthesized is 150 μm, an inclination angle α of 4.0446 is obtained from sin (α)=10.58/150. One interval, in the scanning direction, in each element sequence before it is synthesized is determined to be 149.6264 μm from 150×cos (α). One interval in the scanning direction on the photosensitive body 1 shown in FIG. 8 is then 1945.14 μm because the magnification in the scanning direction is 13 times. The inclination angle θ of the spot sequence shown in FIG. 8 is determined to be 1.2468 degrees from tan (θ)=42.33/1945.14. It is known that a deviation of about ±10% is allowed for the inclination angle θ from the viewpoint of print quality, variations need to be about ±0.4 degree or less.

Next, the focal length of the imaging lens 22 in the photosynthesis device 10 will be described. The use of a single optic sensor as the light receiving element of the light receiving device 24 poses a problem; if its dimension in the vertical scanning direction is large, the range of variations becomes large; if the dimension in the vertical scanning direction is small, light does not enter the optic sensor in a stable manner. When the dimension in the vertical scanning direction is 1 mm, if the focal length of the imaging lens 22 is set to 143.2 mm or more, variations in the spot sequence angle can be suppressed to ±0.4 degree or less. According to this, when the focal length of the imaging lens 22 is set to 150 mm, the interval in the spot sequence on the light receiving device 24 is 0.75 mm and thereby a dimension of 7.5 mm or more is needed. In this aspect, the dimension is set to 10 mm to provide a margin. Accordingly, it can be known that the dimensions of the light receiving device 24 should be set to 1 mm in the scanning direction and 10 mm in the vertical scanning direction.

When a switchover from the basic print dot density 1200 dpi to 2400 dpi is explained, it suffices to use the same process speed, double the revolutions of the rotating polyhedral mirror 13, quadruple the modulated frequency of the light source, and change the interval, in the vertical scanning direction on the photosensitive body 1, of the synthesized rays 11 from the light source from 21.17 μm to 10.58 μm. In this method, the light source is rotated around the optic axis.

Figure 10:
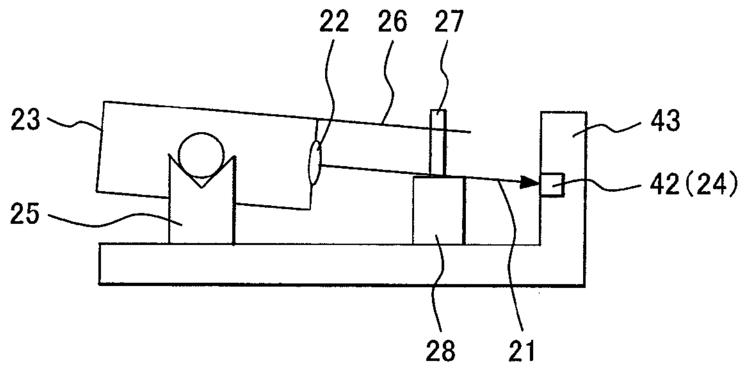
FIG. 10 is an approximate view of an inclined synthesized ray in the present embodiment when the print dot density is 1200 dpi.
Figure 11:
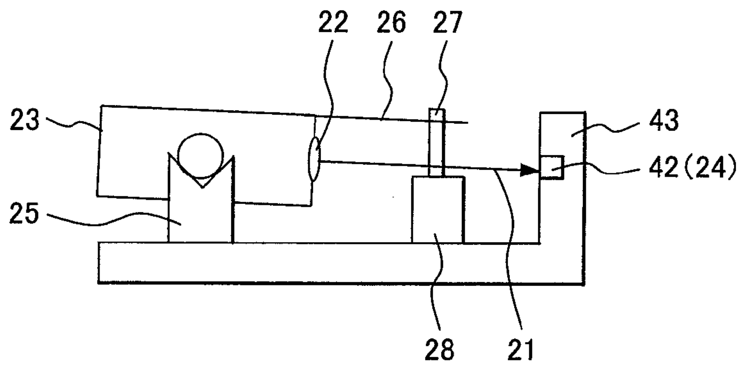
FIG. 11 is an approximate view of an inclined synthesized ray in the present embodiment when the print dot density is 2400 dpi.

In FIGS. 10 and 11, the height of one light receiving element 42 held in the element holder 43 is changed and the supporting box 23 is inclined to match the change. In FIG. 10, the print dot density is 1200 dpi, so the inclination angle of the supporting box 23 needs to be 4.0446 degrees. To achieve this, the motor 28 in FIG. 1 is run to rotate the threaded rod 27 so that a driving arm 26 inclines downward so as to incline the first synthesized rays 21 from the imaging lens 22 with a focal length of 150 mm downward 10.6 mm with respect to the optic axis when the supporting box 23 is horizontal. FIG. 11 shows a case in which the print dot density is 2400 dpi. The same operation as in FIG. 10 is performed so that the first synthesized rays 21 from the imaging lens 22 incline downward 5.3 mm, which is half the downward displacement in FIG. 10, with respect to the optic axis when the supporting box 23 is horizontal.

Figure 12:
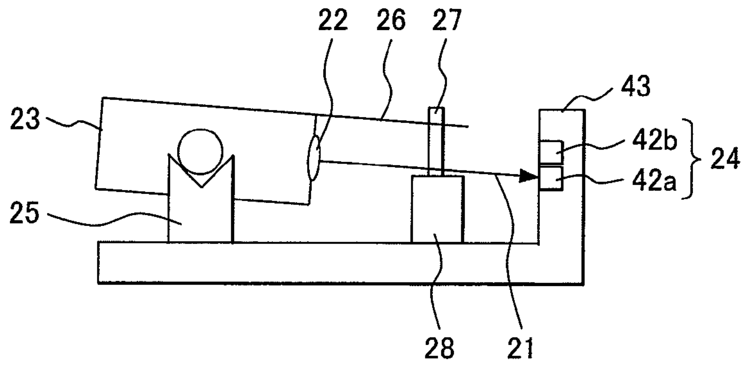
FIG. 12 is an approximate view of a positional relation of light receiving elements in the present embodiment when a print dot density is 1200 dpi and 2400 dpi.

In FIG. 12, two light receiving elements 42*a* and 42*b* are provided in the element holder 43 in the vertical direction with an interval, as in FIG. 7. When the print dot density is 1200 dpi, the light receiving element 42*a* is positioned 10.6 mm downward from the optic axis when the supporting box 23 is horizontal; when the print dot density is 2400 dpi, the light receiving element 42*b* is positioned 5.3 mm downward from the horizontal optic axis.

In an exemplary method of doubling the revolutions of the rotating polyhedral mirror 13 and quadrupling the modulated frequency of the light source, a plurality of revolutions settings and a plurality of modulated frequency settings are given and ones of them are selectively selected. In another method, a single reference revolutions setting and a single reference frequency setting are given, and a plurality of device for switching their ratios are provided to make a switchover.

What is claimed is:

1. A light scanning apparatus comprising a photosynthesis device having a first light source unit and a second light source unit with a plurality of light sources spaced at equal intervals side by side in one direction, respectively for emitting rays in parallel from the plurality of light sources, and a photosynthesis element for synthesizing transmitted rays from the first light source unit and reflected rays from the second light source unit on a single light path; a light receiving device for receiving first synthesized rays synthesized by the photosynthesis element through an imaging lens; and an optical deflecting device for deflecting and scanning second synthesized rays synthesized by the photosynthesis element, and the second synthesized rays passed through the optical deflecting device is being externally emitted;

wherein the photosynthesis device and the light receiving device are displaced relative to the optic axis of the first synthesized rays so as to position focused spots of the first synthesized rays at the center of a light receiving element provided in the light receiving device.

2. A light scanning apparatus comprising a photosynthesis device having a first light source unit and a second light source unit with a plurality of light sources spaced at equal intervals side by side in one direction, respectively for emitting rays in parallel from the plurality of light sources, and a photosynthesis element for synthesizing transmitted rays from the first light source unit and reflected rays from the second light source unit on a single light path; a light receiving device for focusing first synthesized rays synthesized by the photosynthesis device through an imaging lens, and an optical deflecting device for deflecting and scanning second synthesized rays synthesized by the photosynthesis device, and the second synthesized rays passed through the optical deflecting device is being externally emitted;

wherein the photosynthesis device is inclined with respect to the light receiving device so as to position focused spots of the first synthesized rays at the center of a light receiving element provided in the light receiving device.

3. A light scanning apparatus comprising a photosynthesis device having a first light source unit and a second light source unit with a plurality of light sources spaced at equal intervals side by side in one direction, respectively for emitting rays in parallel from the plurality of light sources; and a photosynthesis element for synthesizing transmitted rays from the first light source unit and reflected rays from the second light source unit on a single light path; a light receiving device for receiving first synthesized rays synthesized by the photosynthesis device, through an imaging lens; and an optical deflecting device for deflecting and scanning second synthesized rays synthesized by the photosynthesis device, and the second synthesized rays passed through the optical deflecting device is being externally emitted;

wherein:

the photosynthesis device is supported so as to be capable of being inclined so that the positions of focused spots of the first synthesized rays are capable of being adjusted with respect to a light receiving element provided in the light receiving device;

the light scanning apparatus further comprises: an inclining device for inclining the photosynthesis device, and a control device for controlling an inclination made by the inclining device so as to position focused spots of the first synthesized rays at the center of the light receiving element.

4. The light scanning apparatus according to claim 1 or 2, wherein:

a single light receiving element is provided for the light receiving device; and further comprising:

a device for displacing the position of the single light receiving element in the vertical scanning direction with respect to the focused spots of the first synthesized rays is provided.

5. The light scanning apparatus according to claim 4, wherein:

the light deflecting device is provided with a device for changing the number of deflections; and each of the plurality of light sources is provided with a device for changing a modulated frequency.

6. An image forming apparatus having the light scanning apparatus according to claim 4, wherein the image forming apparatus is structured so that the second synthesized rays are irradiated to a medium to be scanned and focused thereon.

7. The light scanning apparatus according to claim 1 or 2, wherein:

a plurality of light receiving devices are provided at intervals in the vertical scanning direction for the light receiving device; and the first synthesized rays are inclined with respect to the plurality of light receiving devices.

8. The light scanning apparatus according to claim 7, wherein:

the light deflecting device is provided with a device for changing the number of deflections; and each of the plurality of light sources is provided with a device for changing a modulated frequency.

9. An image forming apparatus having the light scanning apparatus according to claim 7, wherein the image forming apparatus is structured so that the second synthesized rays are irradiated to a medium to be scanned and focused thereon.

10. The light scanning apparatus according to any one of claims 1, 2 and 3, wherein:

the light deflecting device is provided with a device for changing the number of deflections; and each of the plurality of light sources is provided with a device for changing a modulated frequency.

11. An image forming apparatus having the light scanning apparatus according to claim 10, wherein the image forming apparatus is structured so that the second synthesized rays are irradiated to a medium to be scanned and focused thereon.

12. An image forming apparatus having the light scanning apparatus according to any one of claims 1, 2 and 3, wherein the image forming apparatus is structured so that the second synthesized rays are irradiated to a medium to be scanned and focused thereon.

* * * * *